Patented Apr. 9, 1929.

1,708,404

UNITED STATES PATENT OFFICE.

ADOLPH ZIMMERLI, OF NEW BRUNSWICK, NEW JERSEY, ASSIGNOR TO RHODIA CHEMICAL CO., OF NEW YORK, N. Y., A CORPORATION OF NEW JERSEY.

PROCESS OF PRODUCING DIBENZYLPHTHALATE.

No Drawing.   Application filed January 28, 1926. Serial No. 84,492.

This invention relates to a process of producing dibenzylphthalate, the object of the invention being to produce a process by means of which this compound may be produced in such quantities as to render it available for industrial application.

I am aware that dibenzylphthalate has been prepared on a laboratory scale (Berichte 28, 1577; 30, 780; 35, 4092). The processes employed, however, did not lend themselves to industrial application, because they were either too expensive, or the yield was too poor to be commercially practicable. Bischoff and Von Hedenstrom (Berichte 35, 4092) tried to prepare the ester according to the following equation:

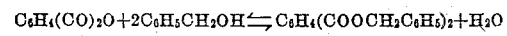

using two molecules of benzylalcohol for one molecule of phthalic anhydride. This reaction, however, is reversible, and an equilibrium is reached which prevents the reaction from being completed. For this reason, unchanged phthalic anhydride was always present in the reaction mixture. Furthermore it is doubtful whether the product of Bischoff and Von Hedenstrom was really dibenzylphthalate which they describe as a heavy oil which does not crystallize. It has been shown by R. Meyer: Berichte 28, 1577 (1895) that pure dibenzylphthalate melts at 42–44° C. As Bischoff and Hedenstrom claim that their product was pure it must be assumed that it had not the same chemical constitution as the product of R. Meyer.

I have discovered that dibenzylphthalate can be prepared from benzylalcohol and phthalic anhydride in almost quantitative yield if an excess of benzylalcohol is used. Under these conditions all the phthalic anhydride is used up and it is not necessary to distill the dibenzylphthalate. While an excess of 20% benzylalcohol gives a good yield it takes a long time to complete the reaction. On the other hand, I have found that by using an excess of approximately 100% benzylalcohol the yield is considerably greater and the reaction is complete in 8 hours.

The following is given as an example of the manner in which the process may be carried out:

148 parts by weight of phthalic anhydride are dissolved in 400 parts benzylalcohol. The solution is heated to the boiling point of benzylalcohol (205° C.) and kept boiling gently for approximately 8 hours. A mixture of water with a little benzylalcohol distils. This is condensed. It forms into two layers, the upper being water, the lower benzylalcohol. This can be used again in another batch.

After all the water formed has been distilled, (18 parts), vacuum is applied and the excess benzylalcohol distilled off. The residual oil is very slightly colored and consists of technical dibenzylphthalate. If it is desired to have it waterwhite, it may be distilled. It boils at 260–285° C. and 10 mm. pressure. The distilled product solidifies on standing and melts at 42–44° C.

In the above example, it is stated that the excess benzylalcohol is distilled off by vacuum. It will of course be obvious that the use of vacuum is not essential, but is made use of merely because of the well known fact that distillation will take place at a lower temperature. It would, however, be quite feasible, after all of the water is eliminated, to heat the liquid to a temperature above 205° C. and distil off the excess benzylalcohol at atmospheric pressure. As a matter of fact, the excess benzylalcohol may be removed by means other than distillation, such for example as repeated washing with water.

The same is true in regard to the distillation of the water formed in the reaction. The course of the reaction would not be changed if the heating were done in an open kettle and the water vapors allowed to escape into the air immediately after they are formed. Some benzylalcohol would be lost which should be avoided for economical reasons but which is immaterial to the process.

Furthermore it is not essential to heat to the boiling point of benzylalcohol, although this is convenient because it shortens the time of reaction. The reaction actually takes place at 110° C., although it is quite slow, and it is therefore preferable to use higher temperatures.

Phthalic acid may be used in place of the phthalic anhydride referred to in the above example, although I prefer the latter because it is technically more easily obtainable and has already one molecule of water removed therefrom.

The speed of the reaction can be increased by the addition of catalyzers, for example, sulphuric acid, hydrochloric acid, zinc chloride and other known catalyzers; however it would be necessary to remove them again. I prefer, therefore, not to use any, although the time of reaction is longer without their use.

What I claim and desire to secure by Letters Patent is:

1. The process of producing dibenzyl phthalate which consists in dissolving phthalic anhydride in an excess of benzylalcohol, heating the solution and gently boiling the same for approximately 8 hours, distilling said solution thereby to remove the water therefrom, and subjecting the residue to vacuum.

2. The process of producing dibenzyl phthalate which consists in dissolving phthalic anhydride in an excess of approximately 100% of benzylalcohol, heating the solution and gently boiling the same for approximately 8 hours, distilling said solution thereby to remove the water therefrom, and subjecting the residue to vacuum.

3. The process of producing dibenzylphthalate which consists in dissolving phthalic anhydride in an excess of benzylalcohol, heating the solution to the boiling point of benzylalcohol and gently boiling the same, distilling said solution thereby to remove the water therefrom, and subjecting the residue to vacuum.

4. The process of producing dibenzylphthalate which consists in dissolving phthalic anhydride in an excess of approximately 100% of benzylalcohol, heating the solution to the boiling point of benzylalcohol and gently boiling the same for approximately 8 hours, distilling said solution thereby to remove the water therefrom, and subjecting the residue to vacuum.

In testimony whereof I have signed my name to this specification.

ADOLPH ZIMMERLI.